US007300196B2

(12) United States Patent
Fleig

(10) Patent No.: US 7,300,196 B2
(45) Date of Patent: Nov. 27, 2007

(54) AUTOMATIC DILUTION SYSTEM WITH OVERFLOW PROTECTION

(76) Inventor: John Fleig, Chemenergy, 491 S. Pearl St., Albany, NY (US) 12202

( * ) Notice: Subject to any disclaimer, the term of this patent is extended or adjusted under 35 U.S.C. 154(b) by 504 days.

(21) Appl. No.: 11/078,213

(22) Filed: Mar. 9, 2005

(65) Prior Publication Data

US 2005/0201200 A1 Sep. 15, 2005

Related U.S. Application Data

(60) Provisional application No. 60/551,746, filed on Mar. 10, 2004.

(51) Int. Cl.
*B01F 15/02* (2006.01)
*G05D 9/12* (2006.01)

(52) U.S. Cl. .............................. 366/153.1; 366/182.4; 422/263; 137/87.02

(58) Field of Classification Search ............. 366/153.1, 366/182.1, 182.4; 422/261, 263, 292; 137/87.02
See application file for complete search history.

(56) References Cited

U.S. PATENT DOCUMENTS 3,695,485 A 10/1972 Littlejohn
4,685,810 A * 8/1987 Sakuichi et al. ......... 366/182.1
4,770,859 A 9/1988 Heiser, Jr.
4,826,661 A 5/1989 Copeland et al.
4,830,509 A 5/1989 Gulmatico, Jr.
5,439,019 A * 8/1995 Quandt et al. ................. 137/2
5,680,877 A 10/1997 Edstrand et al.
5,706,841 A 1/1998 Werre et al.
5,961,845 A 10/1999 List et al.
6,688,329 B2 * 2/2004 Murray et al. .............. 137/392
6,779,539 B1 8/2004 Schwamberger et al.
2004/0151062 A1 * 8/2004 Yao et al. .................. 366/137

* cited by examiner

*Primary Examiner*—Tony G. Soohoo
(74) *Attorney, Agent, or Firm*—Gene Scott; Patent Law & Venture Group

(57) ABSTRACT

A chemical solution dispensing apparatus uses a dissolving tank to hold a solid chemical cake. The dissolving tank delivers the chemical solution into a holding tank by gravitational flow and then to a receiving system. A liquid level sensor in the holding tank senses the liquid level of the solution and calls for water delivery through a conduit into the dissolving tank. When the level reaches a low point a circuit opens a inlet flow valve to deliver water into the dissolving tank. When the level reaches a high point, the circuit closes a safety shutoff valve in the conduit line. A pressure regulator and control relay enable the conduit line to be properly pressurized by an inlet source of water through a shutoff valve that is normally open. When the level in the holding tank rises above the high point, an alarm signal is released to initiate an audible alarm.

8 Claims, 2 Drawing Sheets

AUTOMATIC DILUTION SYSTEM WITH OVERFLOW PROTECTION

RELATED APPLICATIONS

This application claims priority of a prior filed provisional patent application, Ser. No. 60/551,746, filed on Mar. 10, 2004, which discloses the same invention as disclosed and claimed herein.

BACKGROUND OF THE INVENTION

1. Field of the Invention

This invention relates generally to chemical water treatment and more particularly to a system by which a solid chemical cake may be dissolved and fed under controlled conditions for use in a downstream application.

2. Description of Related Art

The following art defines the present state of the field of the present invention, and each disclosure is hereby incorporated herein by reference:

Yao et al., U.S. 2004/0151062, discloses a novel interlocked automatic chemical mixing system and method of use which is particularly well-suited to preparing a final diluted HF (hydrofluoric acid) mixture of desired concentration for the post-cleaning rinsing of semiconductor wafer substrates. The automatic chemical mixing system includes a mixing tank having a normal level sensor and a mixing level sensor above the normal level sensor. A mixing system is provided for thoroughly mixing the liquid precursor components in the mixing tank. In typical application, DI water is introduced into the mixing tank until the DI water reaches the level of the mixing sensor. The precursor aqueous HF is then introduced into the mixing tank until the level of the HF reaches the normal level sensor.

Littlejohn, U.S. Pat. No. 3,695,485, discloses a unit system adapted to feed any number of liquid destinations on demand, especially dangerous liquids, and comprising a protected storage of said liquid, a motor driven pump means supplying said liquid into a holding means, a safety inlet valve governing flow of liquid from said pump means and into the holding means, and a flow outlet dispensing the said liquid; the invention residing in a motor and safety inlet control means responsive to high and low level sensors in said holding means so as to maintain a normal level therein, outlet safety means responsive to excessive flow in said outlet from the holding means and closing the safety inlet valve, and overflow safety means responsive to flooding of the holding means and overriding the motor control means. Utility resides in the adaptability to multiple installations wherein the fluid circuitry of each unit remains individually operable and protected while drawing from a common storage and motor driven pump means.

Heiser, Jr., U.S. Pat. No. 4,770,859, discloses a device for dispensing a caked composition into a liquid that employs a container filled to a desired level with a cake of the composition to be dispensed, and an upwardly opening vessel over which to place the container telescopically so that the cake surface is disposed over the vessel mouth. A support structure is included upon which the vessel is mounted in a position enabling placement of the container over the vessel, the support structure serving to support the vessel so that the vessel mouth is facing upwardly and the rim portion is disposed horizontally. Liquid coupling components couple a flow of liquid from a separate source through an inlet opening in the vessel, so that with the cake surface disposed over the vessel mouth, the liquid fills the vessel, washes across the cake surface to dispense the composition from the cake, and then discharges over the rim portion.

Copeland et al., U.S. Pat. No. 4,826,661 discloses a dispenser for and method of dispensing a concentrated cleaning solution from a solid block of a cleaning composition wherein the concentrated cleaning solution is dispensed at a substantially constant concentration during the entire useful life of the solid block of cleaning composition. The dispenser comprises (i) a spray nozzle for directing a uniform dissolving spray onto an exposed surface of the solid block of cleaning composition; and (ii) a spring or hydraulic piston coupled to the nozzle for biasing the nozzle towards the solid block and thereby maintaining a substantially constant distance between the nozzle and the exposed surface of the solid block of cleaning composition even though the exposed surface recedes due to dissolution by the dissolving spray.

Gulmatico, Jr., U.S. Pat. No. 4,830,509, discloses a device that is provided for dissolving dry detergent to provide a liquid detergent solution to washing machines in a laundry. A tank is divided into upper and lower compartments. The upper compartment drains into the lower compartment when a tank valve there between is opened, and the compartments are maintained in mutual isolation when the tank valve is closed. High and low liquid level sensors in the upper compartment control mixing and dispensation of detergent solution. A quantity of dry, solid powdered detergent is mixed with a predetermined quantity of water in the upper compartment while the upper and lower compartments are isolated from each other during a mixing cycle. During the mixing cycle the lower compartment serves as a reservoir for supplying liquid detergent solution to one or more washing machines. Following the mixing cycle, the contents of the upper compartment are allowed to drain into the lower compartment.

Edstrand et al., U.S. Pat. No. 5,680,877 discloses a method of and system for cleaning and maintaining water distribution pipes which have reduced flow due to an increase of water scale deposits, sediment and the like along the inside surface of the pipe that includes a mobile cleaning unit which can be conveniently and easily connected to a pipe section to be cleaned. An aqueous cleaning solution is introduced and circulated in a first direction through the pipe section for sufficient time to dissolve and loosen scale and sediment. The flow direction of the treating solution is then reversed to break off or remove sediment or other tuberculated growth that has developed directionally with the direction of water flow in the pipe section. The turbulent flow in the opposite direction increases the effectiveness of the cleaning process in particularly troublesome and hard-to-clean pipe sections. The spent treating solution and other deposits are flushed from the pipe and the mobile cleaning unit to an appropriate waste stream. Advantageously, the direction of the flow of the treating solution can be reversed without disconnecting the cleaning unit from the pipe section.

Werre et al., U.S. Pat. No. 5,706,841 discloses an invention that relates to an arrangement for automatically cleaning heat-exchanging passageways, particularly the coolant passageways of tools. According to the invention, the arrangement includes an outlet line, an inlet line and connections for connecting the outlet line and the inlet line to a respective inlet and outlet of the passageway or passageways to be cleaned; a liquid tank; a pump and associated lines for filling the tank with cleaning liquid or with rinsing liquid; a pump and associated lines for circulating liquid from the tank in a closed circuit through the passageway or passageways to be cleaned; and a microprocessor for performing automatically the operations of filling the tank with cleaning liquid, circulating cleaning liquid through the heat-exchanging passageway or passageways, emptying the tank of cleaning liquid, filling the tank with rinsing liquid and circulating the rinsing liquid in the heat-exchanging passageway or passageways, and emptying the tank and the heat-exchanging passageway or passageways of rinsing liquid.

List et al., U.S. Pat. No. 5,961,845 discloses a dispenser system for treating water containing systems in place with a dry chemical substance. The dispenser has a water soluble pouch housing a dry form of a chemical material to be used in treating the system. The pouch is positioned in a make down unit so that the chemical is dissolved to form a liquid concentrate which is then introduced into a water containing system. A controller is attached to the make down unit to regulate the flow of water into the apparatus and the flow of liquid concentrate out of the apparatus and into the water-containing system.

Schwanberger et al., U.S. Pat. No. 6,779,539, discloses an apparatus to dispense water soluble compositions into a process stream that involves recirculating water through the water soluble chemical held in a tank. The recirculating water is heated to establish a defined temperature and repeatedly recirculated through the bed of chemical to achieve relative saturation concentration of the recirculating water. The water is dispensed from the recirculating unit thereby achieving a consistent concentration of chemical in the dispensed water.

Our prior art search with abstracts described above teaches: a solid product system and method of use; an automatic system for dissolving dry detergent; a dispensing apparatus for delivering controlled amounts of water soluable material to a process stream; an arrangement for cleaning automatically heat-exchanging passageways, particularly tool-coolant passageways; a solid block chemical dispenser for cleaning systems; an automatic safety feed system for liquids; a dispenser for chemicals; a system and method for cleaning water distribution pipes; and an automatic chemical mixing system. Thus, the prior art discloses the use of systems and methods for dissolving solid chemical cakes and powders in a solute under automatic control and the use of such chemicals for the cleaning of such systems and similar applications. However, the prior art fails to teach a dissolving system using a dissolving tank and a gravity fed holding tank wherein the dissolving process is controlled by the amount of dissolved chemical in the holding tank, i.e., wherein the inventory solution is generated in proportion to the level of solution in the holding tank. The present invention fulfills these needs and provides further related advantages as described in the following summary.

SUMMARY OF THE INVENTION

The present invention teaches certain benefits in construction and use which give rise to the objectives described below.

In a best mode embodiment of the present invention, a chemical solution dispensing apparatus uses a dissolving tank to hold a solid chemical cake. The dissolving tank receives water forming a chemical solution and then delivers the chemical solution into a holding tank by gravitational flow and then to a receiving system. A liquid level sensor in the holding tank senses the liquid level of the solution and calls for further water delivery through a conduit into the dissolving tank. A pressure regulator and controller enable the conduit line to be properly pressurized by an inlet source of water through a shutoff valve that is normally open. When the level in the holding tank rises above a high point or below a depletion level (very low), an alarm signal is released to initiate an audible, and or visiable alarm.

A primary objective of the present invention is to provide an apparatus and method of use of such apparatus that yields advantages not taught by the prior art.

Another objective of the invention is to control the level of a chemical solution in a holding tank so as to enable satisfactory response to a receiving system that calls for such a solution.

A further objective of the invention is to assure that a solute is delivered to a solid cake in a dissolving tank in such manner as to assure an adequate level of solution in the holding tank.

A still further objective of the invention is to assure that the solute is not delivered to the dissolving tank when the holding tank is at a high point.

A yet further objective of the invention is to assure that a warning is enabled when the holding tank is too full.

Another objective of the invention is to provide flow of water into the dissolving tank according to the level of solution in the holding tank.

A still further objective is to provide automatic pressure regulation to control the rate of fill in the holding tank.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
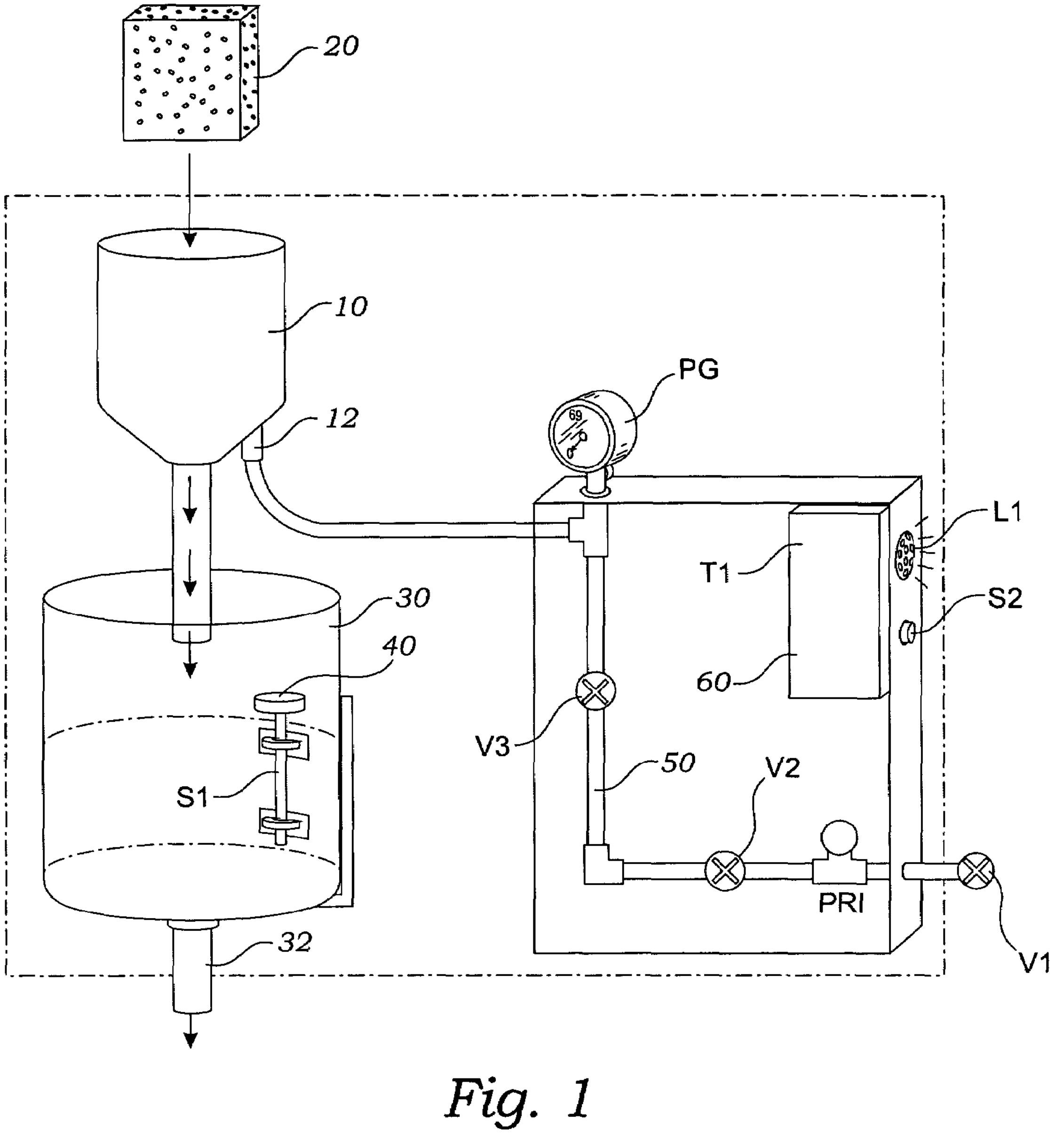
FIG. 1 is a mechanical schematic view of one embodiment of the present invention.

In a preferred embodiment of the present invention a dissolving tank 10 receives a solid chemical cake 20, as shown in FIG. 1, a mechanical schematic of the invention showing its several components and their relationship. A holding tank 30 is positioned below the dissolving tank 10 so that fluid may flow from tank 10 to tank 30 by gravity feed. The chemical cake 20 is able to dissolve when exposed to water forming a chemical solution. Water enters the dissolving tank 10 at inlet 12 and forms an aqueous chemical solution therein. This liquid chemical solution moves from the dissolving tank 10 to the holding tank 30 and therefrom, again by gravity feed, to a drain port 32 at the bottom of the holding tank 30. A liquid level sensor 40 is engaged within the holding tank 30 and is enabled for sensing the liquid level therein. Such liquid level sensors 40 are very well known in the art and are described in the prior art references incorporated herein.

A water delivery conduit 50 interconnects a source of water (not shown), which may be pressure-fed municipal water, water fed from a storage tank or any similar source, to the dissolving tank 10 at inlet 12. The water delivery conduit 50 provides an inlet shutoff valve (V1), typically any common manual valve; a manually adjustable pressure regulator (PR1) of any common type capable of controlling the pressure in the delivery conduit 50 over a desired range of pressures; an electrically operated inlet flow valve (V2) of a normally closed type able to move to a fully open state when energized; an electrically operated safety shutoff valve (V3), a normally open type able to move to a fully closed state when energized; and a pressure gauge (PG) for visually setting-up the system. A timer (T1) is provided to assure safe operation of the invention as will be described.

Figure 2:
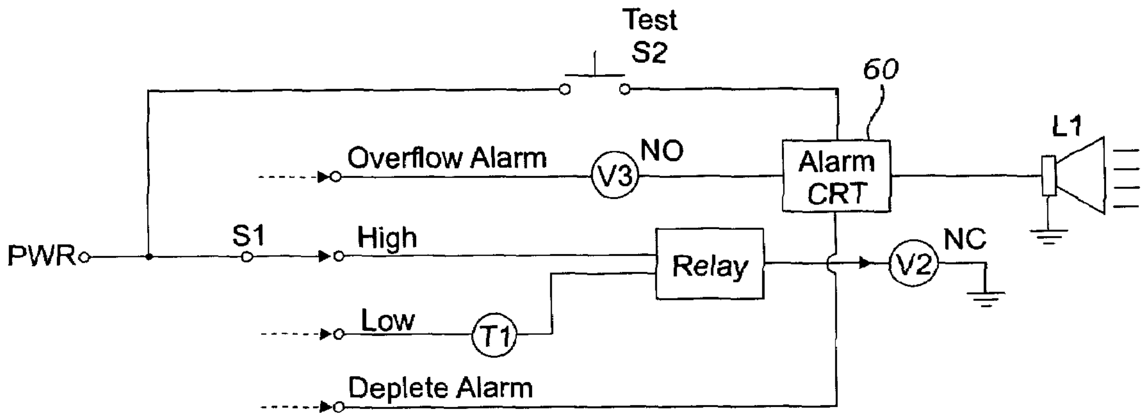
FIG. 2 is an electrical schematic diagram thereof.

As shown in FIG. 1 the liquid level sensor 40 may be a float as shown or any other type of sensor including a solid state device as is well known. Sensor 40 incorporates a switch (S1) that moves with the sensor 40 between a depletion alarm level and an overflow level with sensing locations between these extremes; low level (marked "low" in FIG. 2) and a high level (marked "high" in FIG. 2), as the liquid level changes. When sensor 40 is between the low and high liquid levels, valve V2 is closed (normally closed) and therefore no water enters the dissolving tank 10. Assuming chemical solution in holding tank 10 is continually, or intermittently, draining through port 32, sensor 40 eventually moves to the low level point in the holding tank 30, so that power is supplied to timer (T1) latching it in the open state and starting a fixed timing cycle. Power is therefore provided to V2 through a relay so that V2 moves to the fully open state and water flows through the conduit 50 and into dissolving tank 10. Now chemical solution starts to drain into the holding tank 30 and because timer T1 is latched open, power is maintained to V1 and it remains in the open state even though sensor 40 moves away from the low point. When the chemical solution reaches the high level point in tank 30 power is supplied through the relay so that it closes thereby stopping flow into tank 10; however, the chemical solution in tank 10 will continue to drain into tank 30 so that the fluid level in tank 30 may rise above the high sensing point. Timer T1 may be set for a cycle that is shorter than the time necessary for tank 30 to fill to the high point, and in that instance timer T1 is used as an override on the natural high/low cycle of sensor 40 in tank 30. This is useful when one wishes the fill cycle to be shorter and is considered to be a novel element of the present invention. Timer T1 may also be set for a longer time cycle than is normally expected for the chemical solution to reach the high point in tank 30, and in that instance timer T1 acts as a safety device to assure that tank 30 never reaches an overflow condition should the sensor 40 or switch S1 fail to indicate and act at the high point. When timer T1 times out, power to V2 is cut and V2 closes. Should the timer T1 be set for a time duration longer than the normal fill cycle in tank 30, and should the sensor 40 fail to recognize the high point in tank 30 when the sensor 40 passes the high point, an overflow alarm level is setup in the sensor 40 so that when the fluid level reaches the alarm level, an audible alarm circuit 60 (FIG. 2) is energized and it produces an alarm signal driving enunciator or loud speaker L1. Test switch (S2) may be used to test if the alarm circuit 60 is operating.

In the preferred method of the present invention the dissolving tank 10 receives the solid chemical cake 20. The holding tank 30 is positioned below the dissolving tank 10 so that fluid may flow from tank 10 to tank 30 by gravity feed. The chemical cake 20 is dissolved as water enters tank 10. Water enters the dissolving tank 10 at inlet 12 and forms an aqueous chemical solution therein. This liquid chemical solution moves from the dissolving tank 10 to the holding tank 30 and then drains through port 32 at the bottom of the holding tank 30. The liquid level sensor 40 is engaged within the holding tank 30 and is enabled for sensing the liquid level therein. As an alternative, the drain port 32 may be replaced by a drain tube (not shown) the pulls liquid from tank 30 by suction as is well known in the art.

Water is directed by its pressure into the conduit 50 at valve (V1) and therefrom flows through the pressure regulator (PR1) to inlet flow valve (V2), which, when open, allow the water to flow through safety shutoff valve (V3) and thence to tank 10. Since (V2) is normally closed, an electrical signal is required to maintain (V2) in the open state.

During operation, normally the fluid level in tank 30 is held between a low level point and a high level point. Level sensor 40 senses the fluid level in tank 30 and enables switch S1 at different fluid levels to control valve V2. When sensor 40 is between the low and high liquid level points, valve V2 is closed and therefore no water enters the dissolving tank 10. When sensor 40 moves to the low level point in the holding tank 30, power is supplied to timer (T1) latching it in the open state and starting a fixed timing cycle. Power is provided during this cycle to V2 so that V2 moves to the fully open state and water flows through the conduit 50 and into dissolving tank 10. Now chemical solution starts to fill the holding tank 30 and because timer T1 is latched open, power is maintained to V2 and it remains in the open state. If the chemical solution rises above the high level point in tank 30 power is supplied to safety valve V3 so that it closes thereby stopping flow into tank 10. Timer T1 may be set for a cycle that is shorter than the time necessary for tank 30 to fill to the high point, and in that instance timer T1 is used as an override on the natural high/low cycle of the sensor 40 in tank 30. This is useful when one wishes the fill cycle to be shorter. Timer T1 may also be set for a longer time cycle than is normally expected for the chemical solution to reach the high point in tank 30, and in that instance timer T1 acts as a safety device to assure that tank 30 never reaches an overflow condition should the sensor 40 or switch S1 fail. When timer T1 times out, power to V2 is cut and V2 closes. Should timer T1 be set for a time duration longer than the normal fill cycle in tank 30, and should the sensor 40 fail to recognize the high point in tank 30 when the sensor 40 passes the high point, a higher point or alarm level is setup in the sensor 40 so that when the fluid level reaches the alarm level, an audible alarm circuit 60 (FIG. 2) is energized and it produces an alarm signal driving enunciator or loud speaker L1. Test switch (S2) may be used to test if the alarm circuit 60 is operating. It should be noted that the alarm circuit 60 will be activated whenever the level in tank 30 is at or above the overflow alarm level, or at or below the depletion alarm level so that help may be summoned for remediation of unwanted conditions in the system.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A dispensing apparatus comprising: a dissolving tank enabled by volume thereof for receiving a solid chemical cake; a holding tank communicating with the dissolving tank for gravitational flow of a liquid chemical mixture from the dissolving tank to the holding tank for delivery of the chemical mixture to a system using such mixture; a liquid level sensor engaged within the holding tank for sensing a liquid level therein; a water delivery conduit interconnecting a source of water to the dissolving tank, the water delivery conduit providing:

a) a pressure regulator;

b) an electrically operated normally closed inlet flow valve; and c) an electrically operated normally open safety shutoff valve;

and a timer;

the liquid level sensor in the holding tank interconnected for signal communication with the inlet flow valve and the safety shutoff valve, such that with the liquid level at a low liquid level point in the holding tank the inlet flow valve is opened enabling water flow from the source of water into the dissolving tank, and with the liquid level above a high liquid level point in the holding tank the safety shutoff valve is closed, preventing water flow into the dissolving tank; the timer engaged with the inlet flow valve for closing the inlet flow valve after a selected open inlet flow valve time duration.

2. The apparatus of claim 1 further comprising an audible alarm circuit interconnected with the liquid level sensor, the audible alarm circuit enabling an audible signal when the liquid level reaches a overflow alarm liquid level point in the holding tank.

3. The apparatus of claim 2 further comprising a test switch for closing the audible alarm circuit so as to enable checking operability thereof.

4. A dispensing apparatus comprising: a dissolving tank containing a solid chemical cake capable of dissolving in the presence of water to form a chemical solution; a holding tank communicating with the dissolving tank for gravitational flow of chemical solution from the dissolving tank to the holding tank; a liquid level sensor engaged within the holding tank for sensing a liquid level therein; a water delivery conduit interconnecting a source of water to the dissolving tank, the water delivery conduit providing:

a) a pressure regulator;

b) an electrically operated normally closed inlet flow valve; and c) an electrically operated normally open safety shutoff valve;

and a timer and a relay controller;

the liquid level sensor in the holding tank interconnected for signal communication with the inlet flow valve and the safety shutoff valve, such that with the liquid level at a low liquid level point in the holding tank the inlet flow valve is opened enabling water flow from the source of water into the dissolving tank, and with the liquid level above a high liquid level point in the holding tank the safety shutoff valve is closed, preventing water flow into the dissolving tank; the timer engaged with the inlet flow valve for closing the inlet flow valve after a selected open inlet flow valve time duration; the liquid level sensor further enabled for sensing a deplete alarm level in the holding tank and further enabled for operating an alarm circuit.

5. The apparatus of claim 4 wherein the alarm circuit is enabled for producing an audible signal when the liquid level surpasses the high liquid level point.

6. The apparatus of claim 5 further comprising a test switch for closing the audible alarm circuit so as to enable checking operability thereof.

7. A method for controlling the concentration of a chemical solution, the method comprising the steps of: placing a solid chemical cake into a dissolving tank capable of dissolving the cake in the presence of water to form the chemical solution; interconnecting a holding tank so as to communicate with the dissolving tank for gravitational flow of the chemical solution from the dissolving tank to the holding tank; engaging a liquid level sensor within the holding tank for sensing a liquid level therein; interconnecting a water delivery conduit from a source of water to the dissolving tank, and adapting the water delivery conduit with: an electrically operated normally closed inlet flow valve; and an electrically operated normally open safety shutoff valve; generating signals from the liquid level sensor enabling closing of the inlet flow valve when the level of the chemical solution is at a selected high point; enabling opening of the inlet flow valve when the level of the chemical solution is at a selected low point; and closing the inlet flow valve when the inlet flow valve has been open for a selected period of time.

8. The method of claim 7 further comprising the step of enabling an audible alarm when the liquid level surpasses the selected high point and when the liquid level drops below the selected low point in the holding tank.

* * * * *